United States Patent [19]
Zuardi

[11] 3,741,590
[45] June 26, 1973

[54] PIPE SECTIONS
[76] Inventor: Gerardo Antonio Zuardi, Rua Henrique Lacombe 270, Ilha do Governador, Rio De Janeiro, Estado da Guanabara, Brazil
[22] Filed: July 2, 1971
[21] Appl. No.: 159,243

[52] U.S. Cl. .................................... 285/177, 285/58
[51] Int. Cl. ............................................ F16l 25/00
[58] Field of Search ...................... 285/177, 56, 57, 285/58, 59, 60, 8; 4/252

[56] References Cited
UNITED STATES PATENTS
975,873   11/1910   Knickerbocker ........................ 285/8
3,067,952   12/1962   Aghnides ........................... 285/8 X
2,507,535   5/1960   Modsen ......................... 285/177 X FOREIGN PATENTS OR APPLICATIONS
671,280   8/1929   France ................................. 285/8

Primary Examiner—Dave W. Arola
Attorney—Watson, Cole, Grindle & Watson

[57] ABSTRACT

A pipe section for use in sanitary discharge downpiping having such a form as to prevent the growth on at least a part of its interior wall of a crust formed by repeated contact with said wall by sewage matter, whereby rodents cannot climb upwardly within said piping. The pipe section is provided intermediate its axially aligned inlet and outlet ends with an intermediate part of greater diameter which tapers or curves at its lower end to the diameter of the outlet.

6 Claims, 3 Drawing Figures

PATENTED JUN 26 1973 3,741,590
FIG.1
FIG.2
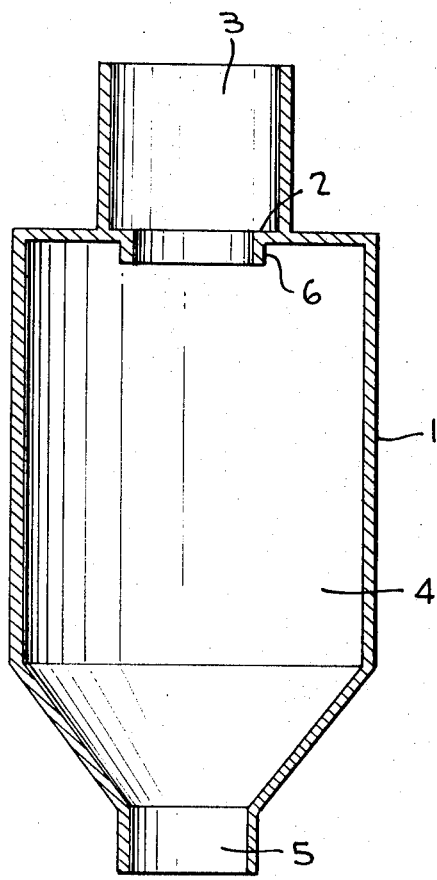
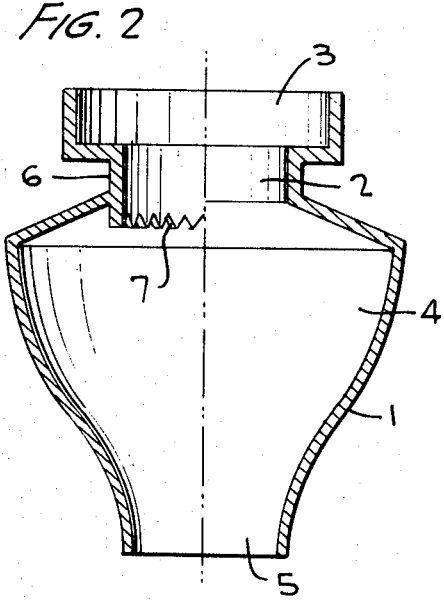
FIG.3
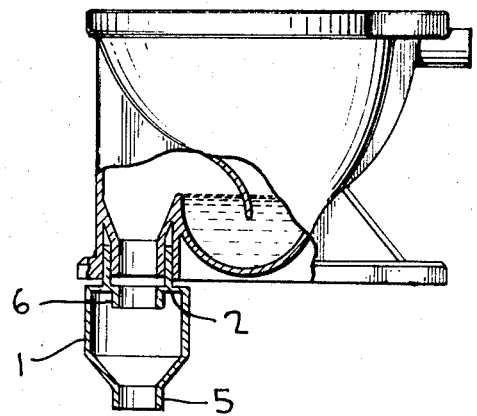
INVENTOR,
GERARDO ANTONIO ZUARDI
BY
Watson, Cole, Grindle & Watson
ATTORNEYS

PIPE SECTIONS

The present invention relates to improvements in pipe sections in general and, specifically, to such pipe sections used in sanitary discharge down-pipes in buildings. The object of the invention is to prevent the passage of animals, particularly sewer rats, through such piping, to the interior of buildings, particularly of the residential type.

As is well known, sewer rats (by which name this species of rodent is known) succeed in passing along the discharge pipes, reaching the lavatory bowls and thus entering the interior of the building. They succeed in doing this by utilizing the crust which builds up on the inner walls of the pipes. This crust, which is not only originated by the continuous passage of sewage matter past the walls of the pipes (such matter being retained by the micro fissures present in the pipe material) but also by the constant internal diameter of each pipe, serves to provide efficient support points for the sewage rats, principally in the vertical sections. The fact that the lavatory bowl is provided with a liquid syphon in no way prevents the exit of the rodents in view of their extreme agility. As a result only the elimination of the above mentioned crust can give any substantial contribution to preventing the passage of these dangerous rodents through sanitary pipes.

With a view to putting the above mentioned theory into practice, the applicant has developed an improvement applicable to pipes in general and particularly to the pipe sections which are used for sanitary outlets, which totally prevents the access of sewage rats to the interior of buildings by the application of the completely new principle in sanitary pipes of making the sewage materials fall across an "empty space".

The invention will now be described in greater detail, but merely by way of example since any variations in dimensions, shapes or material used do not represent any restrictions of limitations to the inventive idea, with reference to the accompanying drawings in which:

FIG. 1 shows a vertical cross section of a first embodiment of a pipe section formed in accordance with the invention;

FIG. 2 shows a second embodiment of a pipe section formed in accordance with the invention; and FIG. 3 shows a conventional lavatory bowl to which has been attached a pipe section formed in accordance with the invention.

With reference now to FIG. 1 of the drawings, the improvement principally resides in the fact that the pipe section 1 has an internal diametral restriction 2 below its upper mouth 3, this upper mouth being the socket end for a spigot and socket joint with a conventional pipe section placed immediately above it, and an internal horizontal cross section of diameter greater than that of the said mouth. Adjacent the other end of the pipe is a middle part having at its lower end a tapering portion terminating at an outlet 5 which forms the spigot end for a spigot and socket joint with a conventional pipe section placed immediately below. The spigot end 5 has a diameter equal to that of the above mentioned restriction 2. This restriction 2 determines the shape of a cylindrical neck 6 which extends vertically a short way into the interior of pipe section 1.

The neck 6, which is arranged on the central axis of the pipe, ensures that the internal walls of the pipe section 1 are maintained completely out of reach of any sewage matter falling down the vertically disposed pipe system, and, moreover, directs it to the outlet 5 which gives access to the immediately adjacent pipe section.

As a consequence, the internal walls of the pipe section 1 will always remain clean since they will not be contacted by any sewage matter falling through the "empty space" determined by the difference between the diameters of neck 6 and of the central part 4.

As will be understood, the crust normally formed as a continuous layer on the interior walls of conventional pipes will now be discontinuous, consequently preventing the ascent of the rodents. At the same time the downwardly extending neck 6 will prevent any rats who cannot continue climbing on the crust from jumping directly to the mouth 3 from the outlet 5. In other words, the neck 6 acts as a form of shield.

Referring now to FIG. 2 in which a second embodiment of the invention is illustrated, a pipe section 1 has a diametral restriction 2 immediately below upper mouth 3, this latter again being the socket end of the pipe section for a spigot and socket joint with a conventional pipe section placed vertically above. Pipe section 1 also has a central part 4 whose internal diameter is greater than that of mouth 3 and which curves downwardly and inwardly until it reaches outlet 5 which forms the spigot end for junction with the socket of a conventional pipe section immediately below. The combination of the neck 6 defined by the restriction 2 and the larger diameter part 4 slowly curving inwardly results in the walls of part 4 being maintained out of reach of any sewage matter falling through the restriction 2 which is aligned with the longitudinal axis of the pipe.

In order to prevent the rats from jumping across the region where they cannot climb due to the lack of crust, the neck 6 is provided with an internal extension 7. This extension 7 may have a jagged low periphery if desired.

As shown in FIG. 4 a pipe section in accordance with the invention can be made integral and manufactured together with a conventional lavatory bowl thus facilitating the instalment of the same in systems using piping in accordance with the invention. Alternatively, the pipe section and the bowl may be manufactured separately but joined before installation. In this way the remaining part of the pipe system may be conventional and such system can be adapted to incorporate the invention merely by removing the top pipe section and replacing it by one constructed in accordance with the invention.

It will be appreciated from the above that the piping in accordance with the invention definitively prevents the problem of entry by gutter rats into the interior of buildings since it is totally impossible for rats to pass through such piping.

I claim

1. A sanitray discharge pipe section, of unitary construction and having a constant gauge thickness throughout, comprising; an inlet opening means of a given diameter at one end of said section, a discharge spigot opening means of a smaller diameter as compared to said inlet opening and being located at the other end of said section exactly in line with said inlet opening, a metallic middle part wherein its peripheral wall has a smooth continuous inner surface and an inner diameter greater than said inlet opening means whereby the wall of said inlet opening means is inset from said peripheral wall, a metallic inner restriction means between said inlet opening and said middle part, the diameter of said restriction means being substantially identical to that of said discharge opening means, at least the portion of said discharge opening means smoothly tapering inwardly in the direction of said discharge opening means at which point its diameter is equal to that of said discharge opening means, and the space between said restriction means and said discharge opening means being larger as compared with the diameter of said discharge opening means.

2. The pipe section according to claim 1 in which said restriction means includes a cylindrical neck extending into said middle part.

3. The section according to claim 1 in which said middle part comprises a cylindrical portion adjacent said restriction means while said tapered portion is frusto-conical.

4. The section according to claim 1 in which said peripheral wall of said middle part curves inwardly toward the longitudinal axis of said middle part.

5. The section according to claim 1 in which said restriction means includes a cylindrical neck extending into said middle part, the lower periphery of said neck being jagged.

6. The section according to claim 1, in which said inlet opening means has a diameter such as to provide a socket end of said pipe section for junction with the spigot end of a pipe section immediately thereabove, and said discharge opening means has a diameter such as to provide a spigot end of said pipe section for junction with the socket end of a pipe section immediately therebelow.

* * * * *